(12) United States Patent
Hertzler et al.

(10) Patent No.: US 12,653,108 B2
(45) Date of Patent: Jun. 16, 2026

(54) NESTED PIN DESIGN FOR COMMON PIVOT

(71) Applicant: CNH Industrial America LLC, New Holland, PA (US)

(72) Inventors: Todd Hertzler, New Holland, PA (US); Jonathan Shenk, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 368 days.

(21) Appl. No.: 18/241,423

(22) Filed: Sep. 1, 2023

(65) Prior Publication Data

US 2025/0072332 A1 Mar. 6, 2025

(51) Int. Cl.
*A01F 15/10* (2006.01)
*A01D 90/08* (2006.01)
*A01F 15/18* (2006.01)

(52) U.S. Cl.
CPC .......... *A01F 15/106* (2013.01); *A01D 90/083* (2013.01); *A01F 2015/186* (2013.01)

(58) Field of Classification Search
CPC ... A01F 15/106; A01D 90/083; B30B 9/3003; B65F 1/1646
USPC ........................................................ 414/557
See application file for complete search history.

(56) References Cited

U.S. PATENT DOCUMENTS

| | | | | |
|---|---|---|---|---|
| 2,683,545 | A | * | 7/1954 | Wood ......................... B60P 1/26 |
| | | | | 414/469 |
| 5,138,942 | A | | 8/1992 | Henderson et al. |

| | | | | |
|---|---|---|---|---|
| 5,158,340 | A | * | 10/1992 | Boda ......................... B65F 3/00 |
| | | | | 298/23 M |
| 6,332,309 | B1 | | 12/2001 | Rodewald |
| 7,380,496 | B2 | | 6/2008 | Viaud |
| 10,383,285 | B2 | | 8/2019 | Simmons et al. |
| 10,385,605 | B2 | | 8/2019 | Limke et al. |
| 11,419,271 | B2 | | 8/2022 | De Baere |
| 2007/0183877 | A1 | * | 8/2007 | Lambright .............. B60P 1/435 |
| | | | | 414/469 |
| 2021/0267128 | A1 | | 9/2021 | Peterson |
| 2022/0015301 | A1 | * | 1/2022 | Derscheid ............. A01F 15/106 |

FOREIGN PATENT DOCUMENTS

| | | | | |
|---|---|---|---|---|
| DE | 29706540 | U1 | 6/1997 | |
| EP | 0217715 | B1 | 6/1991 | |
| WO | WO-9716959 | A1 * | 5/1997 | ............. A01F 15/07 |

* cited by examiner

*Primary Examiner* — Cathleen R Hutchins
(74) *Attorney, Agent, or Firm* — Buchanan Ingersoll & Rooney PC

(57) ABSTRACT

An agricultural baler pivot assembly having: a tailgate pin extending along a rotation axis and having a tailgate pin bore extending along the rotation axis, a first outer face portion extending along the rotation axis and a second outer face portion extending along the rotation axis; a tailgate bushing configured to receive and rotationally support the outer face of the tailgate pin; an arm pin having a respective first outer face portion extending along the rotation axis and a respective second outer face portion extending along the rotation axis; and an arm pin bushing configured to fit radially between the tailgate pin bore and the first outer face portion of the arm pin and support the arm pin for rotational motion relative to the tailgate pin about the rotation axis. Agricultural balers including a pivot assembly and methods for assembling the pivot assembly are also provided.

15 Claims, 8 Drawing Sheets

S100 — Align frame

S102 — Install frame pin

S104 — Align arm

S106 — Install arm pin

S108 — Align pivot roller

S110 — Install roller shaft

S112 — Fix arm pin

S114 — Fix roller shaft

NESTED PIN DESIGN FOR COMMON PIVOT

BACKGROUND OF THE INVENTION

The present invention pertains to agricultural balers.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw (such as wheat or oat straw) which is to be picked up by the baler. The cut crop material typically is raked into a wind-row, and a baler, such as a large square baler or round baler, straddles the windrows and travels along the windrows to pick up the crop material and form it into bales.

A round baler may generally include a frame, supported by wheels, a hydraulic system, a pickup unit to engage and lift the crop material into the baler, a cutting assembly, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting assembly. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The carrier elements typically include a serpentine take-up arrangement to allow them to expand to accommodate the growing bale. For example, a belt may be mounted on a combination of stationary rollers and movable rollers. The movable rollers (typically two) are mounted on one or more arms (sometimes called "serpentine arms") to allow them to move away from the center of the bale. The serpentine arms are biased by tensioners (e.g., mechanical or pneumatic springs) or the like to resist movement away from the bale. The belt is wrapped around the movable rollers and a number of stationary rollers in a serpentine manner, so as to stay in contact with the rollers as the movable rollers move. As the bale increases in size, the portion of the belt that wraps around the bale increases in length. The serpentine portion of the belt that wraps around the stationary rollers and movable rollers decreases in length to provide additional belt length that allows the bale to increase in diameter. As the bale grows, the movable rollers move towards the stationary rollers, reducing the serpentine belt length (i.e., the length wrapping around and extending between the fixed and corresponding movable rollers), and increasing the length of the belt wrapping around the circumference of the bale. During this operation, the movable rollers, and more specifically the tensioner acting on the serpentine arm, generates belt tension that compresses the bale to the desired density.

In a typical baler, the arms are mounted to the baler frame at one pivot location, while the tailgate is mounted to the frame at a different pivot location. This allows the parts to be assembled together one at a time, and can provide benefits to allow greater flexibility in placement of the movable rollers. It is also known to mount a roller on the tailgate pivot, which leads to some assembly issues due to the need to install both the tailgate and the roller at the same location.

The inventors have determined that further improvements can be made to agricultural baler machines.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural baler pivot assembly comprising: a first tailgate pin extending along a rotation axis and having a first tailgate pin bore extending along the rotation axis, a respective first outer face portion extending along the rotation axis and a respective second outer face portion extending along the rotation axis; a first tailgate bushing configured to receive and rotationally support the first outer face of the first tailgate pin; a first arm pin having a respective first outer face portion extending along the rotation axis and a respective second outer face portion extending along the rotation axis; and a first arm pin bushing configured to fit radially between the first tailgate pin bore and the first outer face portion of the first arm pin and support the first arm pin for rotational motion relative to the first tailgate pin about the rotation axis.

In another exemplary aspect, there is provided an agricultural baler pivot assembly comprising: a frame having a frame bore; a tailgate having a tailgate bore; an arm having an arm bore; a tailgate pin extending along a rotation axis and having a tailgate pin bore extending along the rotation axis, a respective first outer face portion extending along the rotation axis and a respective second outer face portion extending along the rotation axis, wherein the respective second outer face portion is fixed in the frame bore; a tailgate bushing positioned radially between the tailgate bore and the first outer face of the tailgate pin to support the tailgate for rotational movement relative to the tailgate pin about the rotation axis; an arm pin having a respective first outer face portion extending along the rotation axis and a respective second outer face portion extending along the rotation axis, wherein the respective second outer face portion is fixed in the arm bore, and wherein the arm pin is rotationally fixed to the pivot roller; an arm pin bushing positioned radially between the tailgate pin bore and the first outer face portion of the arm pin to support the arm pin for rotational movement relative to the tailgate pin about the rotation axis; and a pivot roller mounted to the arm pin for rotational movement relative to the arm pin about the rotation axis.

In another exemplary aspect, there is provided a method for assembling an agricultural baler frame having a frame bore, a tailgate having a tailgate bore, an arm having an arm bore, and a pivot roller, to provide relative rotation between the frame, tailgate, arm, and pivot roller about a rotation axis, the method comprising: (a) positioning the tailgate adjacent to the frame with the tailgate bore aligned with the frame bore along the rotation axis; (b) installing a tailgate pin having a tailgate pin bore along the rotation axis into the frame bore and the tailgate bore; (c) positioning the arm adjacent to the frame with the arm bore aligned with the frame bore along the rotation axis; (d) installing an arm pin having an arm pin bore along the rotation axis into the arm bore and the tailgate pin bore; (e) positioning the pivot roller with a bearing of the pivot roller aligned with the rotation axis; and (f) installing a roller shaft along the rotation axis into the arm pin bore and the bearing.

BRIEF DESCRIPTION OF THE DRAWINGS

Embodiments of inventions will now be described, strictly by way of example, with reference to the accompanying drawings, in which.

DETAILED DESCRIPTION OF THE DRAWINGS

Exemplary embodiments are described herein as a baler including a serpentine pivot roll, which can provide greater ability to handle relatively large bales. However, embodiments can provide other benefits, regardless of the bale size, and it will be understood that embodiments are not limited to particular dimensional or functional requirements unless specifically claimed with such limitations. Additionally, embodiments may be used with any type of agricultural baler, including, for example, those that are configured as towed balers and those that are configured as self-driving balers.

The terms "forward," "rearward," "left" and "right," when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the driving and are equally not to be construed as limiting.

Figure 1:
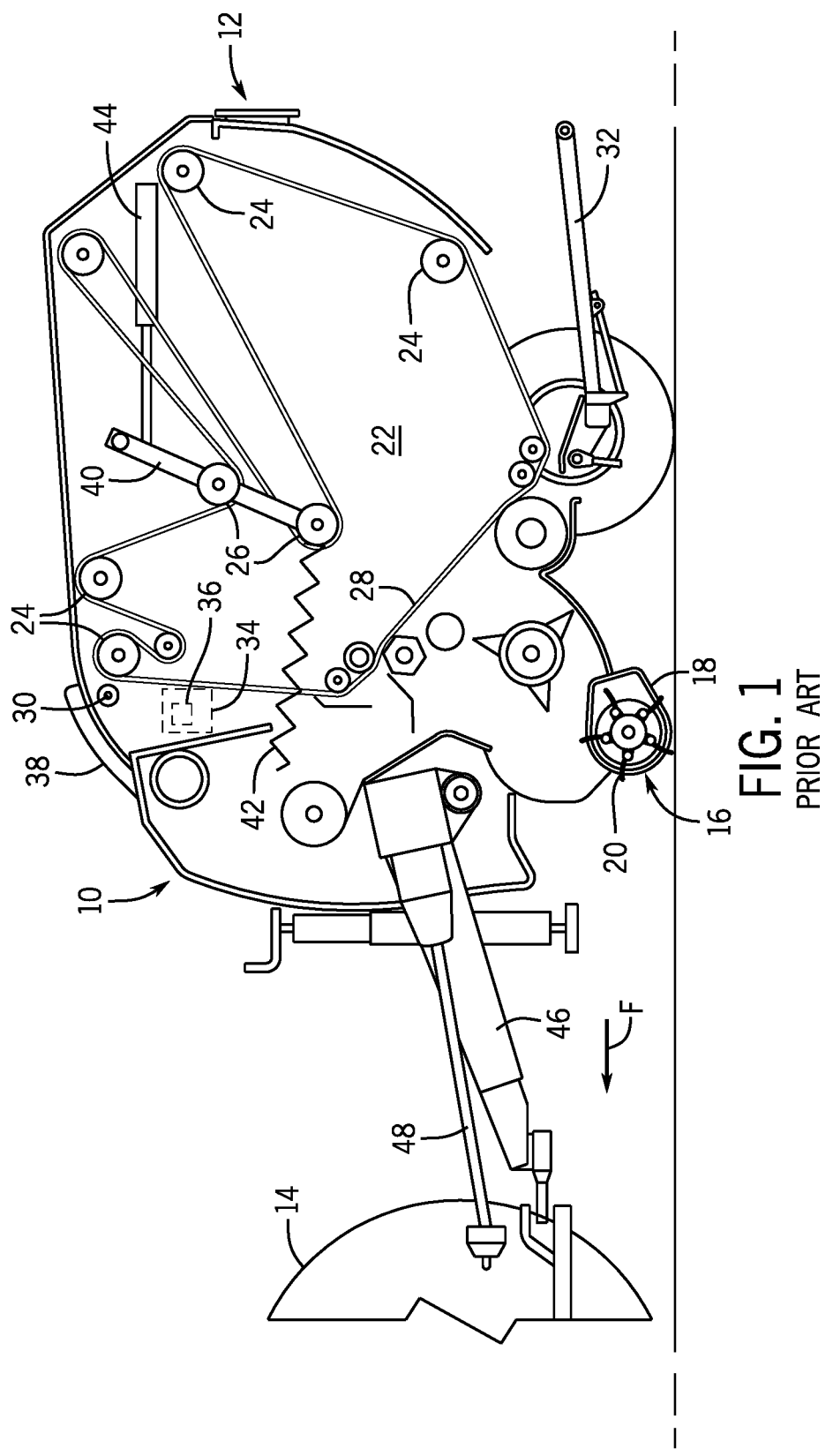
FIG. 1 is a schematic side view of a prior art agricultural baler.

A typical prior art agricultural round baler 10 is shown in FIG. 1, in a configuration to be towed in a forward direction F behind a tractor 14 or other vehicle. In examples herein, the transverse direction extends orthogonal to the page. Crop material is lifted from windrows into the baler 10 by a pickup unit 16. The pickup unit 16 includes a rotating pickup reel 18 with tine bars and tines 20 that move the crop rearward toward a variable bale chamber 22. The reel 18 is rotatable in an operating direction for lifting the crop material off of the ground and may also be operable in a reverse direction, i.e., opposite to the operating direction.

The bale chamber 22 is configured as a variable bale chamber 22 having stationary rollers 24, movable rollers 26, and at least one belt 28 that wraps around the rollers 24, 26. For purposes of this explanation, the term "belt" refers to any type of movable conveyance that is used to wrap the bale, such as chains, woven belts, linked belts, slats, and the like, and also refers to any number of such belts as may be arranged to operate in parallel (e.g., multiple belts wrapped around the rollers 24, 26 and positioned adjacent to each other in the transverse direction). Similarly, a "roller" includes any number of rollers spaced in the transverse direction along a common rotation axis, and rollers having any surface structure (e.g., smooth, cogged, ribbed, etc.). The rollers 24, 26 may comprise a floor roller, starter roller, stationary roller(s), pivot roller(s), stripper roller, follower roller(s), and so on. The movable rollers 26 are mounted on movable supports, typically pivotable arms 40, and tensioners 42 (e.g., one or more mechanical springs or pneumatic accumulators connected to hydraulic cylinders to form a pneumatic spring) are provided to bias the movable rollers 26 to a starting position when there is no bale in the bale chamber 22. One or more actuators 44 may be provided to positively control the positions of the serpentine arms 40 and thus the movable rollers 26.

Together, the rollers 24, 26 and the belt(s) 28 create a circulating chamber 22 that expands between an empty bale position and a full bale position for engaging and rolling the bale. As the bale grows inside the chamber 22 it begins to act upon the belts 28 such that the belts 28 pull the serpentine arms 40 against the springs 42, which in turn causes the movable rollers 26 to move away from the center of the bale so that the variable bale chamber 22 incrementally expands with the size of the bale.

When the bale reaches a predetermined size, the bale is wrapped with a wrapping material (e.g., mesh, twine or polymer sheet) by a wrapper. Then, once fully wrapped, the bale is ejected out of the tailgate 12. The tailgate 12 may pivot upwardly about pivot 30 to open the bale chamber 22. In examples herein, the pivot 30 defines a rotation axis 30a that extends in the transverse direction. Then, ejected bale rolls out of the bale chamber 22 and onto a bale ejector or kicker 32, which pushes the bale rearwardly away from the baler 10 so that the tail gate 12 may pivot back down without hitting the ejected bale.

The baler 10 can further include an electrical processing circuit 34, e.g., a controller 34 with a memory 36, for conducting various baling procedures. For instance, the controller 34 can be configured for carrying out the bale discharge operation. Hence, the controller 34 may open the tailgate 12 via accompanying actuators upon sensing a full bale condition by a bale-size sensor.

The baler 10 has a main frame 38 that supports the various components of the baler 10, including the roller fixation points, drives, tailgate pivot 30, and other features, such as a tow arm 46, power take-off 48, and the like.

The foregoing structures and additional features are generally known in the art, and need not be described herein in more detail.

Figure 2:
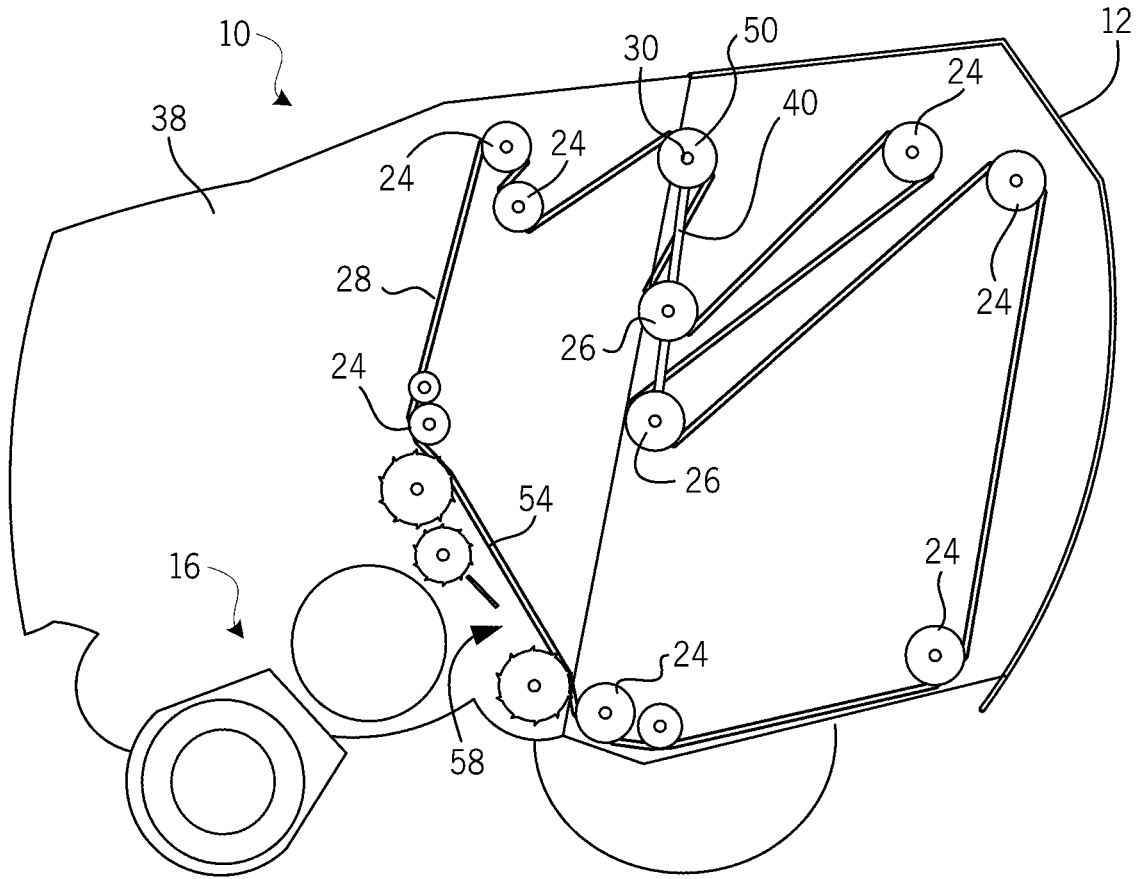
FIG. 2 is a schematic side view of an exemplary agricultural baler having a pivot roller.

Referring to FIG. 2, the inventors have determined that a baler 10 can be construed with a pivot roller 50 that is concentric to the tailgate pivot 30. This construction can allow benefits, such as providing the ability to form a larger bale without making significant changes to the geometry or structure of the arm 40, tensioner 42, actuator 44 and frame 38. However, providing a pivot roller 50 that is concentric with the pivot 30 leads to particular difficulties in constructing the parts in a manner that is both functional and easily and conveniently assembled and serviceable using conventional means available to agricultural baler operators and technicians. Nevertheless, the inventors have determined that a suitable construction can be made as described in the following examples.

Figure 3:
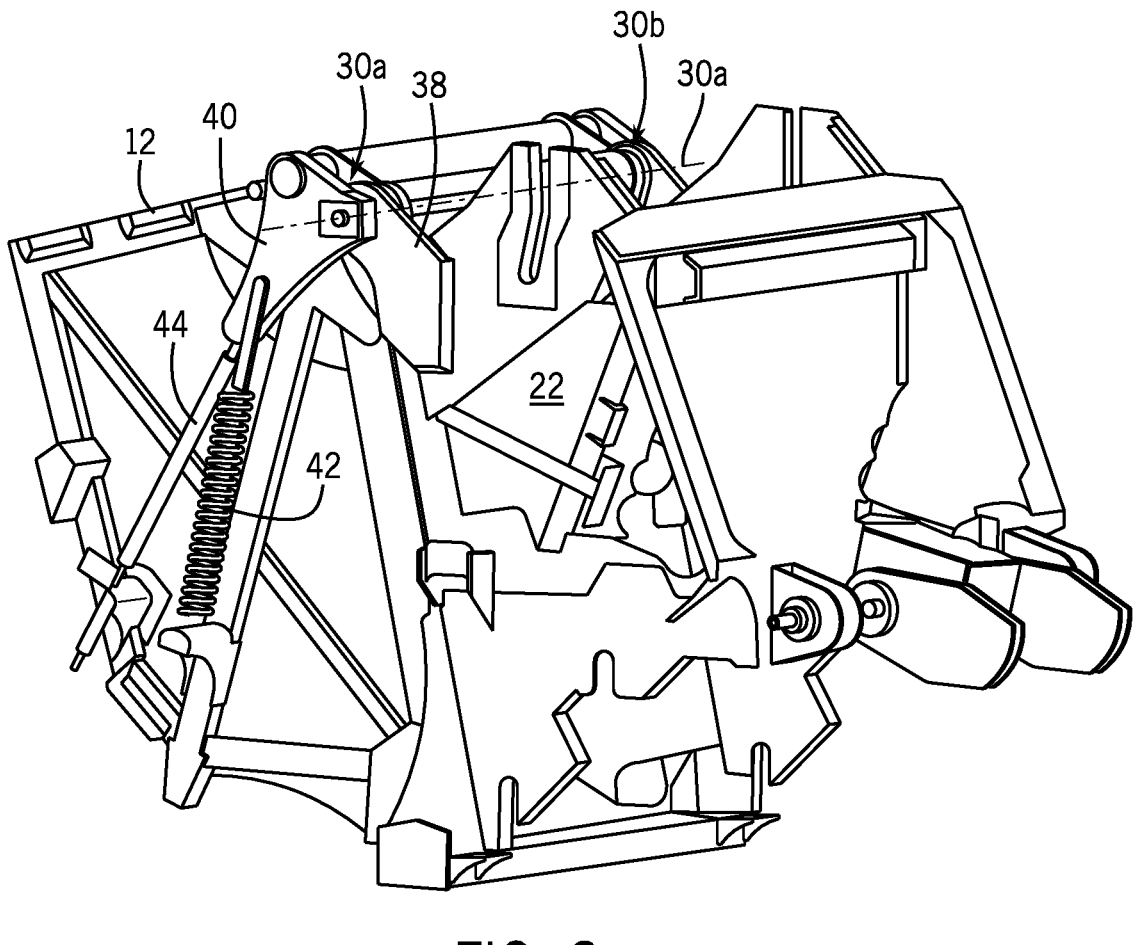
FIG. 3 is an isometric view of portions of an exemplary agricultural baler, with various parts removed.
Figure 4:
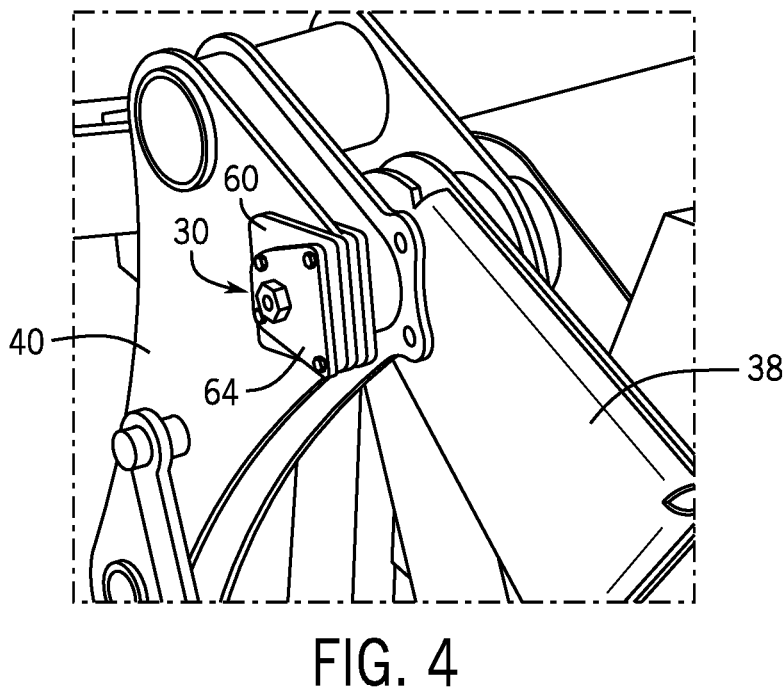
FIG. 4 is a detail view of one pivot assembly of the exemplary baler shown in of FIG. 3.

FIG. 3 shows a baler 10 with various parts removed. Primarily shown are the frame 38, tailgate 12, movable roller arm 40, one tensioner 42, and one actuator 44 (an additional tensioner 42 and an additional actuator 44 may be provided on the other side of the baler 10). The frame 38, tailgate 12 and arm 40 are secured together by an assembly that forms a common pivot 30 having a rotation axis 30*a* about which the tailgate 12, arm 40 and pivot roller 50 rotate. As shown in FIG. 3, the pivot 30 may be defined by two pivot assemblies 30*a*, 30*b* that are spaced apart along the pivot's rotation axis 30*a*. The pivot assemblies 30*a*, 30*b* may be identical or different. FIG. 4 is a detail view of the region around one pivot assembly.

Figure 5:
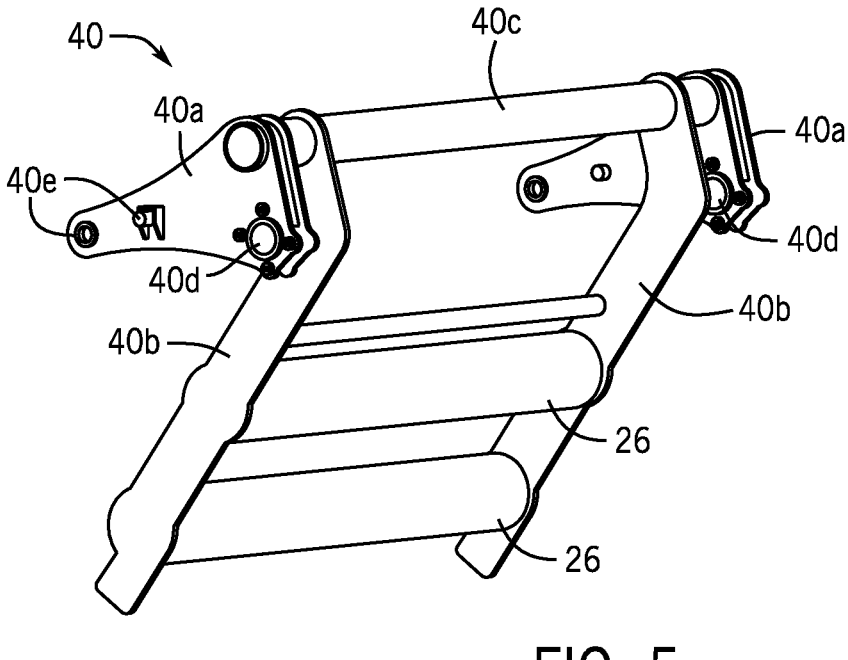
FIG. 5 is an isometric view of an exemplary arm for mounting movable rollers to a baler.

FIG. 5 shows the exemplary arm 40 in more detail. The arm 40 is made up of two outer arms 40*a*, two inner arms 40*b*, and a torsion bar 40*c*. The outer arms 40*a* have respective arm bores 40*d* by which the arm 40 is rotatably secured to the frame 38, as discussed in more detail below. In this example, each arm bore 40*d* comprises a tubular shaft that extends through two parallel plates that form each outer arm 40*a*, but other constructions may be used. The outer arms 40*a* also include various fitting connections 40*e* to which the tensioners 42 and actuators 44 are secured, thus making the outer arms 40*a* operative as levers to apply torsion loads to the inner arms 40*b*. The inner arms 40*b* are elongated to support the ends of the movable rollers 26. The torsion bar 40*c* interconnects the outer arms 40*a* and inner arms 40*b* to form a rigid assembly. When assembled to the rest of the baler 10, the outer arms 40*a* are located outside the baler chamber 22, and the inner arms 40*b* are located inside the baler chamber 22.

FIGS. 6-10 illustrate additional details of a first exemplary pivot assembly 30*a*, shown in various states of an assembly process.

Figure 6:
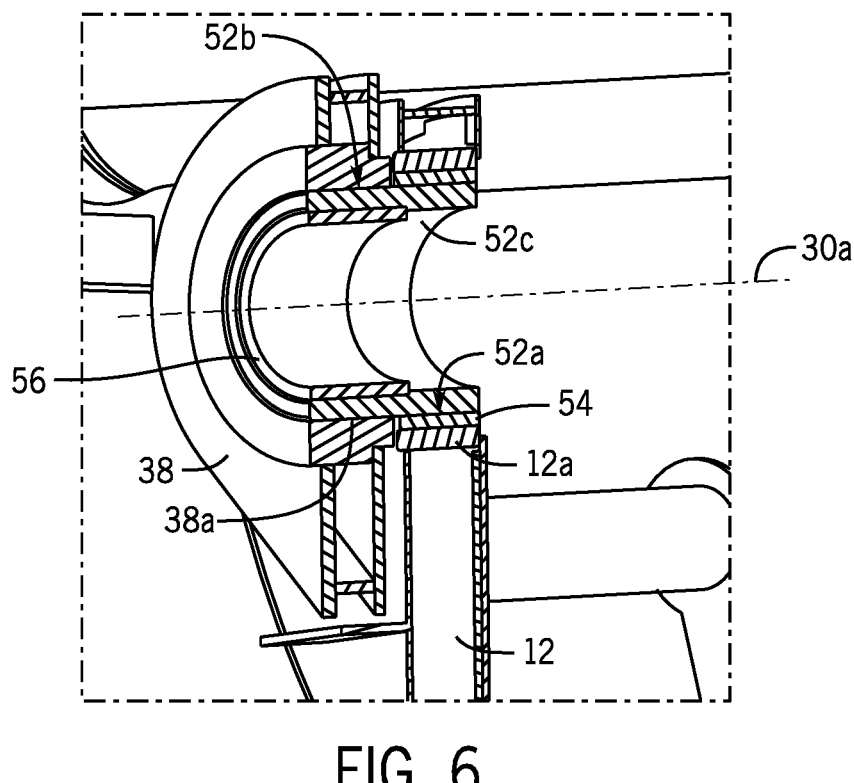
FIGS. 6-10 show an exemplary baler pivot assembly in various stages of assembly.

As shown in FIG. 6, the frame 38 includes a frame bore 38*a*, which is formed as a tubular shaft that is secured between parallel plates forming the local region of the frame 38. Similarly, the tailgate 12 has a tailgate bore 12*a* that is formed as a tubular shaft that is secured between parallel plates forming a local region of the tailgate 12. In each case (as well as the case of the arm bore 40*d* as described above), the shown construction provides a strong and relatively lightweight structure. However, in each case, any other suitable construction for a bore may be used.

FIG. 6 shows the pivot assembly 30*a* in an early assembly stage, in which the tailgate 12 has been positioned adjacent to the frame 38 with the tailgate bore 12*a* aligned with the frame bore 38*a* along the rotation axis 30*a*. A tailgate pin 52 is inserted by sliding it along the rotation axis 30*a* into the frame bore 38*a* and tailgate bore 12*a* to hold the tailgate 12 to the frame 38, while also allowing the tailgate 12 to rotate relative to the frame 38 about the rotation axis 30*a*. The tailgate pin 52 has a first outer face portion 52*a* that is surrounded by the tailgate bore 12*a*, and a second outer face portion 52*b* that is surrounded by the frame bore 38*a*. The first and second outer face portions 52*a*, 52*b* may be respective cylindrical surfaces having the same diameter (e.g., two regions of a single continuous cylindrical outer face) but this is not strictly required.

One or both of the first outer face portion 52*a* and second outer face portion 52*b* is configured to provide a rotating bearing surface to allow the tailgate 12 to rotate relative to the frame 38. In this case, the first outer face portion 52*a* is cylindrical, and a tailgate bushing 54 (e.g., a lubricated low-friction bushing) is installed between the first outer face portion 52*a* and the frame bore 38*a* to provide a rotating connection. In other cases, roller bearings or ball bearings may be used instead of a bushing, and other options will be readily appreciated in view of this disclosure. For example, the first outer face portion 52*a* may be formed as an inner race of a bearing that is fixed to the remainder of the tailgate pin 52 (e.g., in a manner shown in relation to the pivot roller bearing 50*a* described below). The second outer face portion 52*b* may be rotationally fixed inside the frame bore 38*a*, such as by securing it with a friction fit, by metal-to-metal fitment without lubrication, or by forming the second outer face portion 52*b* and frame bore 38*a* with rotationally-interlocking geometries (e.g., complementary square, hexagonal, oval, or other cross-sectional profiles as viewed along the rotation axis 30*a*). Alternatively, the second outer face portion 52*b* may be rotatably mounted in the frame bore 38*a* using a bushing or bearing. In still other cases, the second outer face portion 52*b* may be rotationally mounted in the frame bore 38*a*, and the first outer face portion 52*a* may be rotationally fixed in the tailgate bore 12*a*. Other alternatives and embodiments will be apparent to persons of ordinary skill in the art in view of the present disclosure.

The tailgate pin 52 has a tailgate pin bore 52*c* that extends along the rotation axis 30*a*, and an arm bushing 56 may be inserted into the tailgate pin bore 52*c*.

Figure 7:
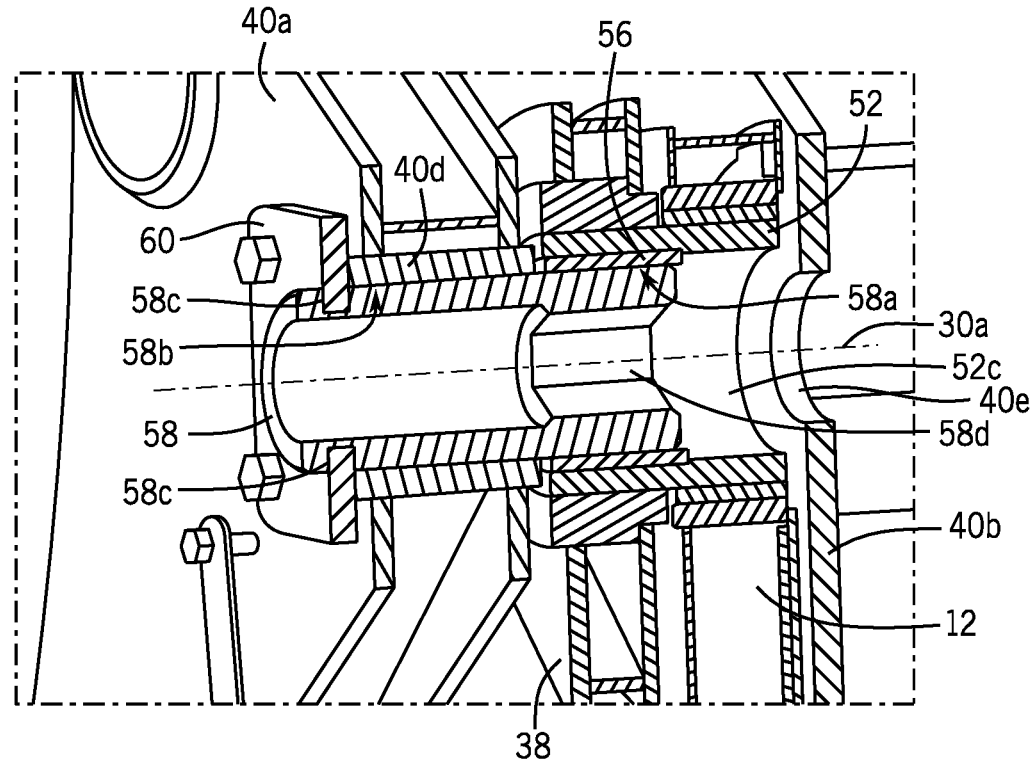

FIG. 7 shows a subsequent state of assembly. Certain features identified by reference numbers are not labeled in FIG. 7 to clarify the explanation. In this state, the arm 40 is positioned adjacent to the frame 38 with the arm bore 40*d* aligned with the frame bore 38*a* along the rotation axis 30*a*. An arm pin 58 is installed by sliding it along the rotation axis 30*a* into the arm bore 40*d* and the tailgate pin bore 52*c*. The arm pin 58 holds the arm 40 to the frame 38 and the tailgate 12, while allowing the arm 40 to rotate relative to the frame 38 and tailgate 12 about the rotation axis 30*a*. The arm pin 58 has a first outer face portion 58*a* and a second outer face portion 58*b* that extend along the rotation axis 30*a*, with the first outer face portion 58*b* being received in the tailgate pin bore 52*c*, and the second outer face portion 58*b* being received in the arm bore 40*d*. The first and second outer face portions 58*a*, 58*b* may be respective cylindrical surfaces having the same diameter (e.g., two regions of a single continuous cylindrical outer face) but this is not strictly required.

Similar to the tailgate pin 52, one or both of the first outer face portion 58*a* and second outer face portion 58*b* of the arm pin 58 is configured to provide a rotating bearing surface to allow the arm 40 to rotate relative to the frame 38 and tailgate 12. In this case, the first outer face portion 58*a* is cylindrical, and is installed within the tailgate pin bore 52*c*, with the arm bushing 56 providing a rotating bearing surface. As with the tailgate pin 52, roller bearings or ball bearings may be used instead of a bushing, and other options will be readily appreciated in view of this disclosure. For example, the first outer face portion 58*a* may be formed as an inner race of a bearing that is fixed to the remainder of the arm pin 58 (e.g., in a manner shown in relation to the pivot roller bearing 50*a* described below). The second outer face portion 58*b* of the arm pin 58 may be rotationally fixed inside the arm bore 40*d*, such as by securing it with a friction fit, by metal-to-metal fitment without lubrication, or by forming the second outer face portion 58*b* and arm bore 40 with rotationally-interlocking geometries (e.g., complementary square, hexagonal, oval or other cross-sectional profiles as viewed along the rotation axis 30*a*). Alternatively, the second outer face portion 58*b* of the arm pin 58 may be rotatably mounted in the arm bore 40*d*, and the first outer face portion 58*a* may be rotationally fixed in the tailgate pin bore 52*c*. Other alternatives and embodiments will be apparent to persons of ordinary skill in the art in view of the present disclosure.

FIG. 7 also shows the arrangement of the inner and outer arms 40*a*, 40*b* relative to the frame 38 and tailgate 12.

Specifically, the frame 38 and tailgate 12 are located between the outer arm 40a and inner arm 40b. A portion of the inner arm 40b may be located along the rotation axis 30a, in which case an opening 40e may be provided through the inner arm 40b to allow parts to pass, as explained below.

In the shown example, the second outer face portion 58b of the arm pin 58 is rotationally fixed to the arm 40 by an arm pin lock 60 that engages the second outer face portion 58b. In this case, the arm pin lock 60 is a plate having arms that fit into linear grooves 58c cut along opposite sides of the second outer face portion 58b, to provide a rotationally-interlocking geometric connection. The arm pin lock 60 is secured to the arm 40 by bolts or other fasteners to thereby lock the arm pin 58 against rotation about the rotation axis 30a relative to the arm 40. The arm pin lock 60 also may be configured to axially fix the arm pin 58 against movement along the rotation axis 30a relative to the arm 40. For example, the grooves 58c in the shown example capture the arms of the plate-like arm pin lock 60 along the rotation axis 30a to prevent relative axial movement. Other alternatives and embodiments will be apparent to persons of ordinary skill in the art in view of the present disclosure. For example, the arm pin 58 may include an integrally-formed flange that extends radially to lie flush with the side of the arm 40, and the flange may have holes through which bolts can be passed to prevent the arm pin 58 from rotating relative to the arm 40.

Figure 8:
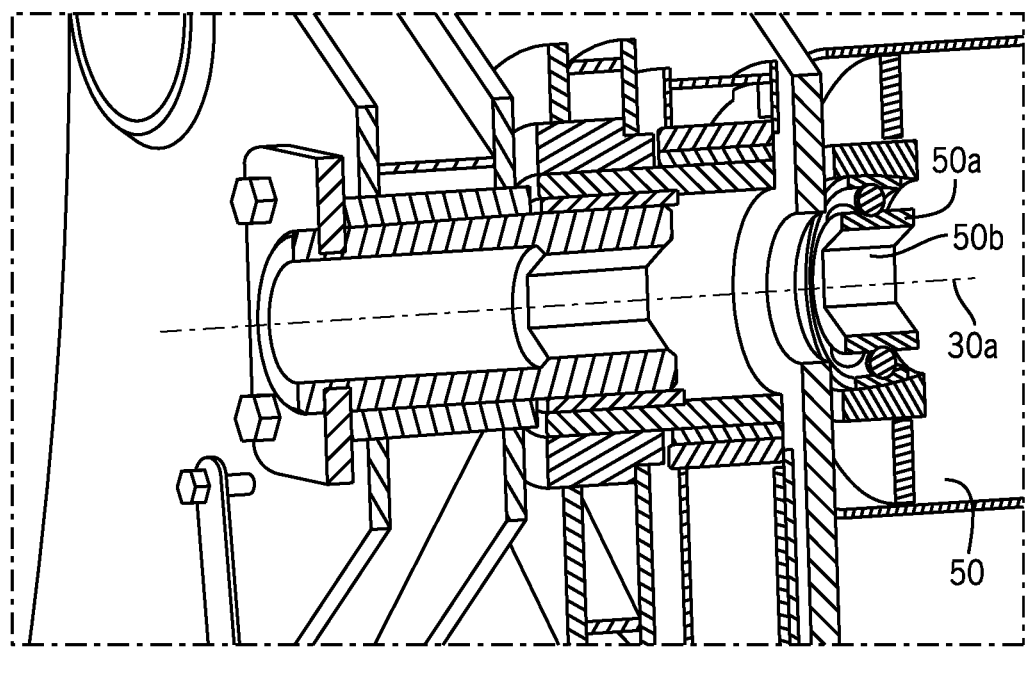

FIG. 8 shows another subsequent state of assembly. Here, the pivot roller 50 is positioned with a bearing 50a of the pivot roller 50 aligned with the rotation axis 30a. The bearing 50a is operatively connected to the pivot roller 50 in a known manner to rotationally support the operating outer face of the pivot roller 50. The inner race of the bearing 50a may have a bore 50b with a non-circular cross-sectional profile as viewed along the rotation axis 30a, such as a hexagonal profile as shown. In addition, the arm pin 58 may have an arm pin bore 58d with a non-circular cross-sectional profile as viewed along the rotation axis 30a, which may match that of the bearing bore 50b.

Figure 9:
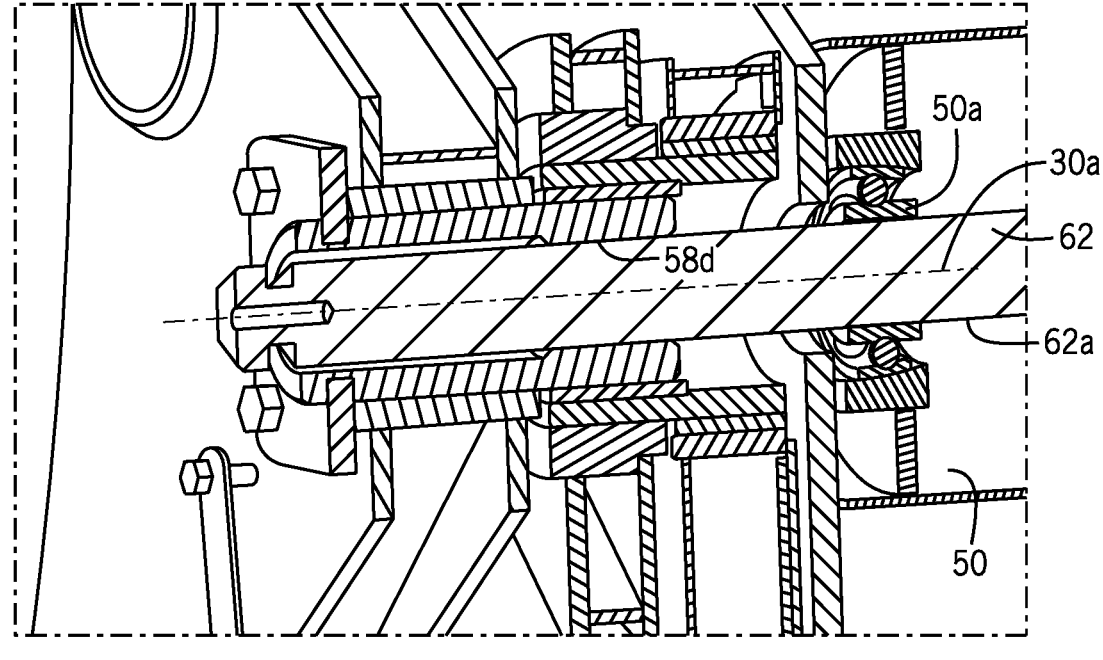

FIG. 9 shows another subsequent state of assembly, in which a roller shaft 62 is inserted along the rotation axis 30a through the arm pin bore 58d and the pivot roller bearing 50a. The roller shaft 62 holds the pivot roller 50 on the rotation axis 50a. The roller shaft 62 may comprise a simple cylindrical rod, but in the shown example, the outer surface 62a of the roller shaft 62 has a non-circular cross-sectional profile as viewed along the rotation axis 30a (e.g., hexagonal) that rotationally interlocks with the cross-sectional profiles of one or both of the arm pin bore 58d and pivot roller bearing 50a. The rotationally interlocking profiles prevent the roller shaft 62 from rotating relative to the arm pin 58 and inner race of the bearing 50a, thereby eliminating the possibility of unwanted relative rotation and possible friction-induced damage between the parts. In other embodiments, different mechanisms may be used to rotationally fix the roller shaft 62 to the arm pin 58 or other parts, or the roller shaft 62 may be freely rotatable relative to the arm pin 58 or other parts. Other alternatives and embodiments will be apparent to persons of ordinary skill in the art in view of the present disclosure.

Figure 10:
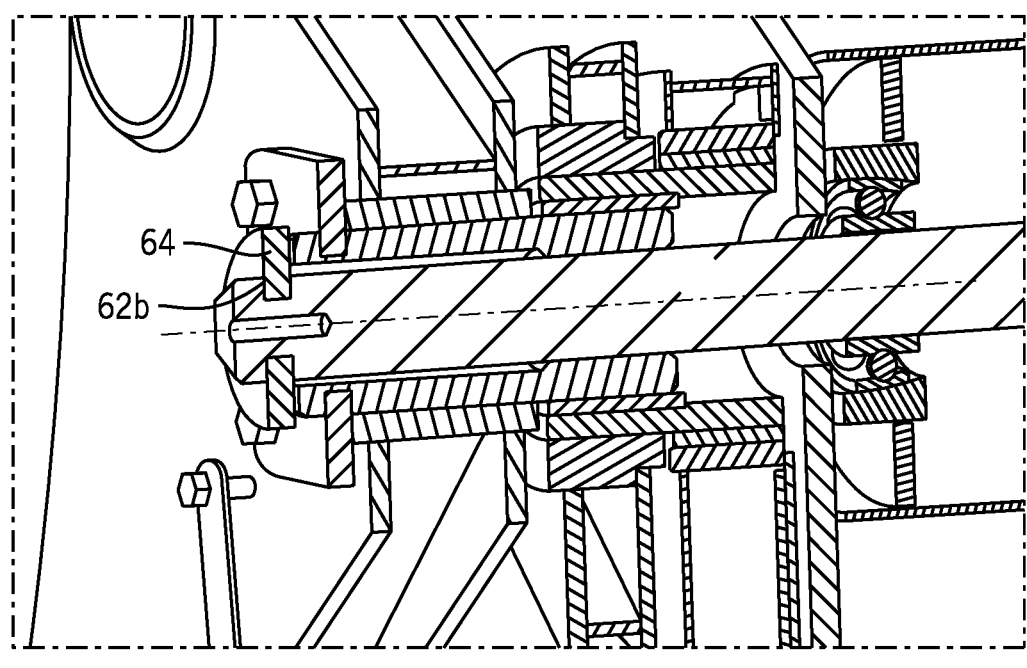

FIG. 10 shows a final state of assembly in which the roller shaft 62 is axially fixed to the arm 40. In this case, the end of the roller shaft 62 has one or more grooves 62b that receive a roller shaft lock 64. The roller shaft lock 64 comprises a plate-like structure having arms that fit into the grooves 62b, and holes to receive bolts or other connectors that join the roller shaft lock 64 to the arm 40. The arms are captured in the grooves 62b along the rotation axis 30a, and thereby prevent the roller shaft 62 from moving relative to the arm 40 along the rotation axis 30a.

The roller shaft lock 64 may be connected directly to the arm 40, or secured to the frame 40 through an intermediate part such as the arm pin lock 60. An example of this kind of arrangement is best shown in FIG. 4, in which the arm pin lock 60 is bolted to the arm 40, and the roller shaft lock 64 is stacked on the arm pin lock 60 and secured to the arm 40 by bolts that pass through aligned holes through the roller shaft lock 64 and the arm pin lock 60.

Embodiments of agricultural balers 10 may include one or more pivot assemblies as described above. For example, a baler 10 may have two essentially identical, but mirror image pivot assemblies that are positioned on respective sides of the baler 10 to secure each side of the tailgate 12, arm 40, and pivot roller 50 to the frame 38, to provide relative rotation between all four of these parts about the rotation axis 30a.

Figure 11:
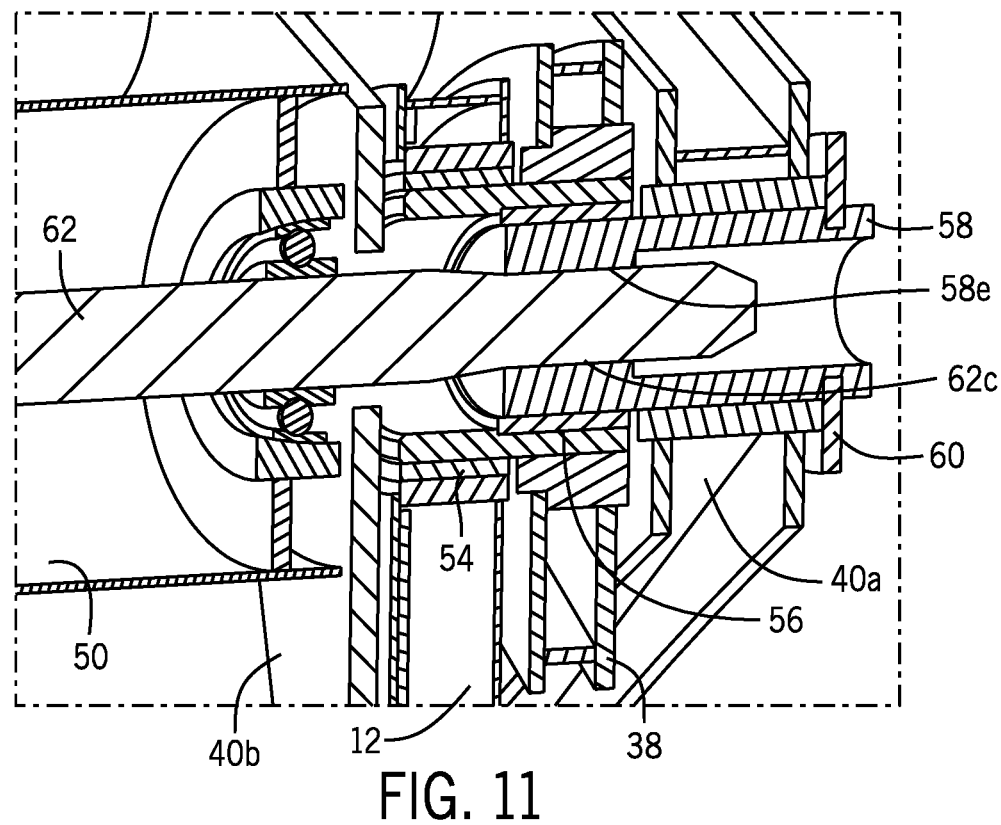
FIG. 11 shows another embodiment of a baler pivot assembly.

In other cases, a baler 10 may have one or more pivot assemblies as described above, that are used in combination with pivot assemblies having different constructions. For example, in the embodiment of FIG. 3, pivot assembly 30a may be constructed according to one of the foregoing embodiments, and pivot assembly 30b may be constructed as shown in the embodiment of FIG. 11. FIG. 11 shows a pivot assembly that is generally the same as that of FIGS. 6-10, but differs in the manner in which the roller shaft 62 is supported by the arm pin 58. Here, the roller shaft 62 terminates at a cylindrical outer surface 62c, and the arm pin 58 has a cylindrical bore 58e that receives and supports the cylindrical outer surface 62c. The arm pin 58 preferably is rotationally locked to the arm 40 by an arm pin lock 60 or the like, so that the roller shaft 62 does not rotate relative to the arm pin 58. In addition, because the roller shaft 62 is axially fixed at the other end, it is not strictly necessary to axially fix this end of the roller shaft to the arm 40 or other parts, but some kind of axial fixation or limitation on movement may be provided (e.g., a pin or circular clip). It has been found that this type of alternative construction for the second pivot assembly 30b can be helpful to allow the roller shaft 62 to align with and insert into the arm pin 58, particularly if the roller shaft 62 has a non-circular profile that might twist along its length and therefore be misaligned in the rotation direction with a matching non-circular bore of the arm pin 58.

Figure 12:
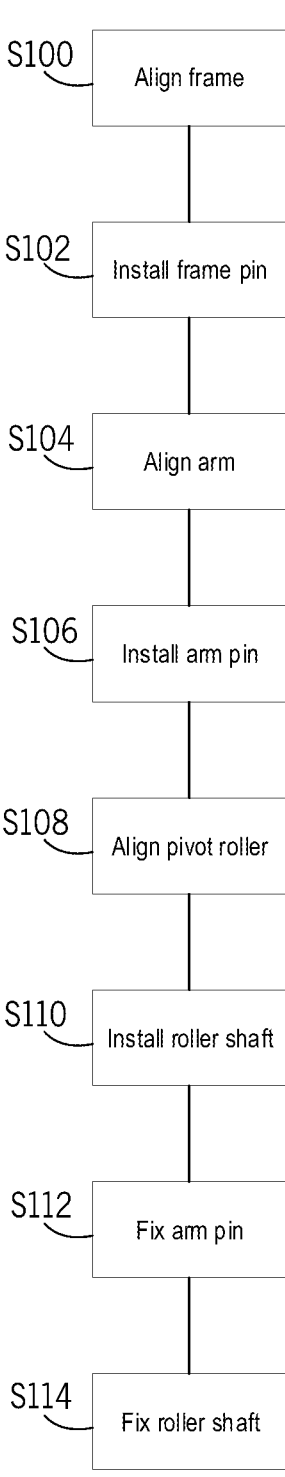
FIG. 12 is a flowchart showing a process for assembly a baler pivot assembly. In the figures, like reference numerals refer to the same or similar elements.

The foregoing examples provide a convenient and effective way to assemble, disassemble and service a pivot roller 50 that is concentric with the tailgate rotation axis 30. Briefly stated, and as shown in FIG. 12, in one embodiment the pivot roller 50 can be assembled according to the following steps.

In step S100, the tailgate 12 is positioned adjacent to the frame 38 with the tailgate bore 12a aligned with the frame bore 40a along the rotation axis 30a.

In step S102, the tailgate pin 52 is installed by sliding it along the rotation axis 30a into the frame bore 38a and the tailgate bore 12a. The tailgate pin 52 may be installed from either direction, but it may be more convenient to slide the tailgate pin 52 through the frame bore 38a side first. This step also may include installing the tailgate bushing 54 between an outer cylindrical surface 52a of the tailgate pin 52 and the tailgate bore 12.

In step S104, the arm 40 is positioned adjacent to the frame 38 with the arm bore 40d aligned with the frame bore 38a along the rotation axis 30a.

In step S106, the arm pin 58 is installed by sliding it along the rotation axis 30a into the arm bore 40d and the tailgate pin bore 52c. At this point, a first outer surface 58a of the arm pin 58 is positioned concentrically within the tailgate pin bore 52c and the frame bore 38a. The arm pin 58 may be installed in either direction along the rotation axis 30a, but it is expected to be most convenient to install the arm pin 58 by sliding it through from the arm bore 40d side first. This step also may include installing the arm bushing 56 between an outer cylindrical surface 58a of the arm pin and the tailgate pin bore 52c.

In step S108, the pivot roller 50 is positioned with its bearing 50a aligned with the rotation axis 30a.

In step S110, the roller shaft 62 is inserted along the rotation axis 30a through the arm pin bore 58d and the bores 50b of the pivot roller bearings 50a (any number of bearings 50a may be used, but preferably there are at least two bearings 50a with one at or near each end of the pivot roller 50). As the roller shaft 62 is installed, it optionally may engage matching rotationally-interlocking shapes between the outer surface 62a of the roller shaft 62 and the arm pin bore 58d and bearing bores 50b to prevent relative rotation therebetween. Also, as the roller shaft 62 is installed, it eventually emerges from the other end of the pivot roller 50, and is set into a rotationally supporting receptacle (e.g., as shown in FIG. 11 or otherwise), to support that end of the roller shaft 62.

A similar process may be used to install a pivot assembly of the same or other construction at the other transverse side of the baler 10. When this is complete, the frame 38, tailgate 12, arm 40 and pivot roller 50 are all movable relative to each of the others about the rotation axis 30a.

The method may further include, in step S112, rotationally and axially fixing the arm pin 58 to the arm 40, such as by installing an arm pin lock 60 as described herein.

The method also may include, in step S114, axially fixing the roller shaft 62 to the arm 40, such as by installing a roller shaft lock 64 as described herein.

The foregoing apparatus and method address the problem of aligning the various parts of a baler 10 having a pivot roller 50, but also can be applied to other assembly processes, such as a baler having an arm 40 and tailgate 12 that rotate relative to the frame 38 about a common pivot axis 30a. The process allows the operator to align and secure the parts in stages, rather than all at once, which greatly simplifies the procedure and allows the use of conventional equipment such as a single hoist or the like, or simply using manpower where the parts do not have an excessive weight. Thus, the method and apparatus improve ease of assembly, disassembly, and service of the parts.

It will be understood from this disclosure that embodiments may be modified in various ways. For example, the arm pivot 58 could be secured to the roller shaft 62 before assembling the arm pivot 58 into the arm bore 40d and tailgate pin bore 52c. The arm pivot 58 also may be integrally formed with the arm pivot 58, such as by providing the two parts as a welded or machined assembly. Other alternatives and embodiments will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. For example, a counterknife as described and claimed herein may be used in conjunction with other, conventional counterknives, and so on. Also, features identified in the singular or by a specific number are not intended to be limited to a single features or the described number of features unless specifically recited as being present only in the specified quantity.

The invention claimed is:

1. An agricultural baler pivot assembly comprising:
a first tailgate pin extending along a rotation axis and having a first tailgate pin bore extending along the rotation axis, a respective first outer face portion extending along the rotation axis and a respective second outer face portion extending along the rotation axis;
a first tailgate bushing configured to receive and rotationally support the first outer face of the first tailgate pin;
a first arm pin having a respective first outer face portion extending along the rotation axis and a respective second outer face portion extending along the rotation axis; and
a first arm pin bushing configured to fit radially between the first tailgate pin bore and the first outer face portion of the first arm pin and support the first arm pin for rotational motion relative to the first tailgate pin about the rotation axis,
wherein the first arm pin comprises a first arm pin bore extending along the rotation axis and having a non-circular cross-sectional profile as viewed along the rotation axis.

2. The agricultural baler pivot assembly of claim 1, wherein:
the respective first and second outer face portions of the first tailgate pin comprise respective cylindrical surfaces having a common diameter; and/or
the respective first and second outer face portions of the first arm pin comprise respective cylindrical surfaces having a common diameter.

3. The agricultural baler pivot assembly of claim 1, further comprising a first arm pin lock configured to engage the first arm pin to prevent the first arm pin from moving relative to the first arm pin lock along the rotation axis and/or about the rotation axis.

4. The agricultural baler pivot assembly of claim 1, further comprising:
a second tailgate pin extending along the rotation axis and having a second tailgate pin bore extending along the rotation axis, a respective first outer face portion extending along the rotation axis and a respective second outer face portion extending along the rotation axis;
a second tailgate bushing configured to receive and rotationally support the first outer face of the second tailgate pin;
a second arm pin having a respective first outer face portion extending along the rotation axis and a respective second outer face portion extending along the rotation axis, and a second arm pin bore extending along the rotation axis and having a circular cross-sectional profile as viewed along the rotation axis; and a second arm pin bushing configured to fit radially between the second tailgate pin bore and the first outer face portion of the second arm pin and support the second arm pin for rotational motion relative to the second tailgate pin about the rotation axis.

5. An agricultural baler pivot assembly comprising:

a frame having a frame bore;

a tailgate having a tailgate bore;

an arm having an arm bore;

a tailgate pin extending along a rotation axis and having a tailgate pin bore extending along the rotation axis, a respective first outer face portion extending along the rotation axis and a respective second outer face portion extending along the rotation axis, wherein the respective second outer face portion is fixed in the frame bore;

a tailgate bushing positioned radially between the tailgate bore and the first outer face of the tailgate pin to support the tailgate for rotational movement relative to the tailgate pin about the rotation axis;

an arm pin having a respective first outer face portion extending along the rotation axis and a respective second outer face portion extending along the rotation axis, wherein the respective second outer face portion is fixed in the arm bore;

an arm pin bushing positioned radially between the tailgate pin bore and the first outer face portion of the arm pin to support the arm pin for rotational movement relative to the tailgate pin about the rotation axis; and a pivot roller mounted to the arm pin for rotational movement relative to the arm pin about the rotation axis.

6. The agricultural baler pivot assembly of claim 5, further comprising a roller shaft extending along the rotation axis and having a respective outer face portion, wherein:

the pivot roller is supported on the roller shaft to rotate relative to the roller shaft about the rotation axis;

the arm pin comprises an arm pin bore extending along the rotation axis; and the roller shaft is rotationally fixed within the arm pin bore.

7. The agricultural baler pivot assembly of claim 6, wherein the roller shaft is rotationally fixed within the arm pin bore by respective rotationally interlocking non-circular cross-sectional profiles of an outer face portion of the roller shaft and the arm pin bore.

8. The agricultural baler pivot assembly of claim 7, further comprising a roller shaft lock connected between the roller shaft and the arm and configured to prevent the roller shaft from moving relative to the arm along the rotation axis.

9. The agricultural baler pivot assembly of claim 5, further comprising an arm pin lock connected between the arm pin and the arm and configured to prevent the arm pin from moving relative to the arm along the rotation axis and/or about the rotation axis.

10. A method for assembling an agricultural baler frame having a frame bore, a tailgate having a tailgate bore, an arm having an arm bore, and a pivot roller, to provide relative rotation between the frame, tailgate, arm, and pivot roller about a rotation axis, the method comprising:

(a) positioning the tailgate adjacent to the frame with the tailgate bore aligned with the frame bore along the rotation axis;

(b) installing a tailgate pin having a tailgate pin bore along the rotation axis into the frame bore and the tailgate bore, wherein the installing the tailgate pin into the tailgate bore comprises installing a tailgate bushing radially between the tailgate bore and an outer cylindrical surface of the tailgate pin;

(c) positioning the arm adjacent to the frame with the arm bore aligned with the frame bore along the rotation axis;

(d) installing an arm pin having an arm pin bore along the rotation axis into the arm bore and the tailgate pin bore;

(e) positioning the pivot roller with a bearing of the pivot roller aligned with the rotation axis; and (f) installing a roller shaft along the rotation axis into the arm pin bore and the bearing.

11. The method of claim 10, wherein:

installing the arm pin into the tailgate pin bore comprises installing an arm bushing between an outer cylindrical surface of the arm pin and the tailgate pin bore.

12. The method of claim 10, further comprising rotationally and axially fixing the arm pin to the arm.

13. The method of claim 10, further comprising rotationally fixing the roller shaft to the arm pin.

14. The method of claim 10, further comprising axially fixing the roller shaft to the arm.

15. The method of claim 10, wherein one or more of steps (a), (b), (c), (d), (e) and (f) is performed at a different time than one or more of the remaining steps.

* * * * *